3,023,079
METHOD FOR THE PREPARATION OF SELENIDES AND TELLURIDES
Stanley M. Kulifay, Dayton, Ohio, assignor to Monsanto Chemical Company, St. Louis, Mo., a corporation of Delaware
No Drawing. Filed Sept. 12, 1958, Ser. No. 760,550
11 Claims. (Cl. 23—50)

The present invention relates to a new method for the preparation of inorganic metal compounds, such as binary and higher tellurides, selenides, antimonides, and arsenides, and particularly mercury telluride and silver antimonide. It is an object of the invention to prepare a semiconductor-type of a crystalline form of the said metal compounds. It is a further object of the invention to prepare the said metal compounds by a low-temperature precipitation method employing solutions of phosphorus reducing agents, such as hypophosphorous acid, as a precipitating agent and using simple apparatus. The term "phosphorous reducing agent" as employed herein refers to a phosphorus compound in which the phosphorus is present in what is ordinarily considered to be the trivalent state under the reaction conditions. The compound may be employed either in aqueous or non-aqueous (for example alcohol) systems. Various phosphorous reducing agents may be used, including phosphorous acid, metaphosphorous acid, hypophosphorous acid, pyrophosphorous acid, and the alkyl and aryl derivatives thereof, such as ethyl hypophosphite, as well as salts, for example the ammonium or sodium salts. Other phosphorous reducing agents including substances which yield the above compounds under the reaction conditions such as phosphorous trichloride may be employed in the present invention. The preferred members of these phosphorous reducing agents are hypophosphorous acid, phosphorous acid, their salts, and phosphorous trichloride.

It is also an object of the invention to prepare metal binary, ternary and higher compounds, such as tellurides, selenides, antimonides, and arsenides having a precisely-controlled stoichiometric or non-stoichiometric composition. In general, the present method makes it possible to prepare various mixed compounds, that is, "doped" binary ternary and higher compounds, in addition to the pure binary compounds. The "doped" compositions referred to herein are those in which a given stoichiometric or non-stoichiometric compound contains an added element, usually in very small amounts. It is also an object of the invention to prepare uniformly "doped" metal tellurides, selenides, antimonides, and arsenides by precipitating such modified compounds by means of the phosphorus reducing agents set forth above.

It is a further object of the invention to prepare in essentially quantitative yield various binaries, such as tellurides, selenides, antimonides, and arsenides and other compounds of metals selected from the group consisting of mercury, platinum, palladium, lead, indium, cobalt, tin, antimony, bismuth, cadmium, nickel, thallium, ruthenium, rhodium, osmium, iridium, copper, silver, gold, tellurium and selenium by precipitation from soluble compounds by means of hypophosphorous acid or the various reducing agents set forth above. The method constituting the present invention may also be employed to produce such other combinations as mercury, cupride, nickel bismuthide and lead platinide.

The prior art methods which have been available for the preparation of semiconductor-type compounds have suffered a disadvantage in that it has been difficult to achieve the desired precise or predictable proportions which are necessary in order to obtain controlled semiconductive properties. For example, the conventional method of preparing mercury telluride has been a relatively high-temperature, long-time (up to 80 hours) fusion of the respective elements. Another method for the preparation of mercury telluride has been by the reaction of solutions of mercury salts with the highly toxic, exceedingly unstable hydrogen telluride in a complicated apparatus. Both of these prior art methods have yielded mixtures of uncertain composition which being inherently unbalanced, were unpredictable for use as a semiconductor material.

Another difficulty encountered in the methods of the prior art has been the lack of quantitative control of "doping" additives. Such additive materials are employed in minor proportions, which have been difficult to introduce in the precise amounts required to obtain the desired semiconductive properties.

The present method also eliminates the difficulty purification of metal tellurides, selenides, antimonides, and arsenides which involve distilling off the unreacted components at high temperatures from the crude compounds obtained by conventional methods. One of the difficulties which has attended distillation purification is the partial decomposition of the product with a consequent loss of the desired stoichiometric proportion.

Another advantage of the present method is that it avoids the necessity of first isolating solids such as selenites and tellurites for subsequent reduction. The desired selenide or telluride or other desired compound is produced directly from solutions of the metals and/or metalloids.

In one embodiment of the present invention the process begins with the production of a solution of the desired purity containing the dissolved compounds of the specific metal or metals desired in the final product. The components may also be introduced as the respective elements or compounds which are dissolved or vaporized for further reaction. However, the invention may be carried out in any desired medium, preferably selected from the group consisting of solutions, melts and vapors. The media contemplated in the present invention embrace solutions of the metal ions, including tellurium, selenium, antimony, and arsenic as well as liquid media, such as melts exemplified by molten chloride, such as selenium chloride and bismuth chloride. Vapor phase media are also included, for example mercuric chloride and tellurium chloride may be reacted with the reducing agent with or without a carrier gas.

The concentration employed when solutions are used will be dictated in large part by the solubility of the respective compounds, for example, chloride or nitrates of mercury, indium, cobalt, tin, antimony, lead, bismuth, cadmium, nickel, platinum, palladium, ruthenium, rhodium, osmium, iridium, thallium, copper, silver, gold, tellurium, selenium, and combinations thereof. In general, the concentration of the soluble metal salt and of the soluble tellurium, selenium, antimony, or arsenic compound may range up to the solubility limits of the respective compounds. For example, in preparing mercury selenide, the mercuric nitrate was employed as a 20% solution, while the selenous acid was used in 10% to 15% by weight solution. The source materials of the said tellurides, selenides, antimonides and arsenides are preferably the acid solutions of the element of oxide or any pure, soluble compound. In general, the proportion of the phosphorous reducing agent which is employed is 0.1 to 25.0 g. molecular weight (mole) of the said phosphorous reducing agent per gram atomic weight of the said tellurium, selenium, antimony, or arsenic. When the reducing agents are mentioned herein, such expressions include not only the reducing agents, per se, but also the salts and derivatives, such as the ammonium, potassium and sodium salts in which form the said reducing agents are commonly supplied. The ammonium salt is preferred.

The solution as described above may be heated in order to increase the solubility of the respective compounds therein. The pressure under which the process is conducted is usually atmospheric, but is not critical, and moderate pressure may be employed. The time required for the reaction is also a non-critical factor, although reaction appears to be complete after the first few minutes.

The precipitation of the desired binary and mixed compounds, such as metal tellurides, selenides, arsenides and antimonides is preferably carried out by adding a combined solution of the said starting materials to a solution of aqueous hypophosphorous acid or other phosphorous reducing agent. However, the three solutions of the anion, the cation and the reductant may also be mixed simultaneously, or by first adding the reductant to one of the reactants, or to the combined mixture. The strength of such solutions is not critical, although it is desirable, in making stoichiometric compounds, to operate with an excess of the solution containing the reductant such as hypophosphorous acid. The present invention may employ either a liquid medium for the precipitation as described above, or a spray-type of precipitation employing liquid sprays of some of the starting materials, such as the metal salts and/or the reducing agent.

The above discussion has been concerned chiefly with the prepartion of stoichiometric compounds. However, non-stoichiometric compositions may readily be made by the present method by employing an excess of one or the other components. For example, an excess of 1% by weight of bismuth introduced in the preparation of bismuth telluride ($Bi_2Te_3$) results in the production of a uniform product having 1% bismuth as free metal in excess of the theoretical $Bi_2Te_3$. The working solutions described above may also contain therein any desired soluble doping compound capable of reduction to the element by the reducing agent, such as copper, silver, gold or the platinum metals.

The by-products of the reaction are water-soluble and accordingly can readily be removed from the product by simple filtration and washing.

The temperature employed in carrying out the invention may be from 20° C. to 100° C. in aqueous systems or 20° C. to 200° C. in vapor systems in order to obtain a reduction to the desired metal selenide, telluride, antimonide, or arsenide.

Another embodiment of the present invention based upon the precipitation of binary, and mixed compounds, such as ternary and higher compounds by phosphorous reducing agents is the employment of a metal-complexing agent in the precipitation. Preferred complexing agents in the present invention include the group of tartaric acid, citric acid and malic acid. It has been found that the use of the said complexing agents makes it possible to carry out the precipitation without incurring the precipitation of metal hydroxides or other contaminating basic compounds. The proportion of the complexing agents, such as tartaric acid, may be varied widely, such as over the range of from 0.1% to 20% by weight relative to the weight of the total solution present. The precipitating agents may also be employed as salts, for example the ammonium and sodium salts, or as phosphorus trihalides.

The following examples illustrate specific embodiments of the present invention.

*Example 1*

The preparation of mercury telluride was carried out by first weighing out 1.9987 g. of mercury which was dissolved by warming with 10 ml. of 1:1 nitric acid. The tellurium was provided as 1.2680 g. of the powdered element, in equivalent stoichiometric proportion with the mercury. The tellurium was dissolved in the above acid mixture with the aid of 16 ml. of 1:1 aqua regia in water.

A solution containing the hypophosphorous acid precipitating agent was prepared from 30 ml. of 50% hypophosphorous acid dissolved in 150 ml. of water. The hypophosphorous acid was completely dissolved and the solution was heated to boiling, after which the solution of mixed mercury and tellurium compounds was added thereto slowly with constant stirring. A black precipitate of mercury telluride, which formed during the stirring operation, soon formed a dense, black powder. After boiling for 90 minutes, the product was obtained by filtering the solution and washing the precipitate with water, followed by methanol. The product was dried at 95° C., and the yield was 99.6% (small mechanical losses occurred in prepartion). It was analyzed by X-ray diffraction analysis and was found to be face-centered cubic in structure and to have the stoichiometric proportion of the compound HgTe. The lattice constant for the compound was 6.44. No other crystalline material, such as uncombined Te, could be detected.

*Example 2*

The preparation of mercury selenide, HgSe, was carried out by first weighing out 2.0102 g. of mercury which was dissolved by warming with 10 ml. of 1:1 nitric acid. The selenium was provided as 0.7920 g. of the powdered element, in equivalent stoichiometric proportion with the mercury. The selenium was dissolved in the above acid mixture with the aid of 9 ml. of 2:1 nitric acid in water.

A solution containing the phosphorus acid precipitating agent was prepared from 50 ml. of 30% phosphorus acid dissolved in 150 ml. of water. The phosphorus acid was completely dissolved and the solution was heated to boiling, after which the solution of mixed mercury and selenium compounds was added thereto slowly with constant stirring. A black precipitate of mercury selenide, which formed during the stirring operation, soon formed a dense, black powder. After boiling for 90 minutes, the product was obtained by filtering the solution and washing the precipitate with water, followed by methanol. The product was dried at 95° C., and the yield was 99.0%. It was analyzed by X-ray diffraction analysis and was found to be face-centered cubic in structure and to have the stoichiometric proportion of the compound HgSe. No other crystalline material, such as uncombined Se, could be detected.

*Example 3*

The preparation of silver antimonide, $Ag_3Sb$, was carried out by preparing separate water solutions of 5.0967 g. of silver nitrate and 3.3394 g. of potassium antimonyl tartrate. In this instance the use of the tartrate provides a complexing action by reason of the presence of the tartrate radical. The antimony solution, at room temperature, was added to a mixture of 30 ml. 50% hypophosphorous acid, plus 150 ml. water, followed by the silver nitrate solution. This was then heated to boiling and handled in accordance with the method of Example 1. The product was a gray-black, ortho-rhombic microcrystalline powder having the formula $Ag_3Sb$, and having the lattice diffraction constants of $a_0=2.990$, $b_0=5.225$ and $c_0=4.820$ angstroms. The yield was 100.0%.

*Example 4*

The preparation of bismuth selenide, $Bi_2Se_3$, was carried out by preparing separate solutions of 1.5533 g. of bismuth oxide in 20 ml. 1:1 nitric acid and 0.7896 g. of selenium in 9 ml. 2:1 nitric acid. The combined solutions were added to a boiling solution prepared from 20 ml. phosphorus trichloride in 250 ml. water. This was then boiled and handled in accordance with the method of Example 1. The product was a black microcrystalline powder which was examined by X-ray diffraction analysis which showed it to be $Bi_2Se_3$. The yield was 98.0%.

*Example 5*

The preparation of bismuth telluride, $Bi_2Te_3$, was conducted by first dissolving 1.1650 g. of $Bi_2O_3$ in 15 ml. 2:1 (by volume) hydrochloric acid; and 0.9571 g. of tellurium element in 16 ml. of 1:1 aqua regia. The combined solutions were then added to a boiling solution of 30 ml. 50% hypophosphorous acid in 150 ml. water and 10 ml. concentrated hydrochloric acid. This was then handled in accordance with the method of Example 1. The black product was obtained as a rhombic microcrystalline powder, which was subjected to X-ray diffraction analysis and found to exhibit a strong pattern of $Bi_2Te_3$ as the only crystalline component, with $a_0 = 10.44$ angstroms.

*Example 6*

Nickel selenide, NiSe, was prepared, utilizing 2.6285 g. of nickelous sulfate hexahydrate dissolved in water, to which there was then added 0.7896 g. of selenium element dissolved in 9 ml. of 2:1 nitric acid. The precipitation was carried out using ammonium hypophosphite as follows. The above mixed solutions were added to a boiling solution of 30 ml. 50% hypophosphorous acid, 150 ml. of water, and 50 ml. ammonium hydroxide corresponding to 24 g. of ammonium hypophosphite. Upon concentrating the solution to about 100 ml. by boiling, a vigorous reaction set in, accompanied by considerable foaming and deposition of a gray precipitate, which when isolated in accordance with the method of Example 1 and subjected to X-ray diffraction analysis proved to be hexagonal NiSe with lattice constants of $a_0 = 3.66$, and $c_0 = 5.33$.

What is claimed is:

1. Method for the preparation of a compound selected from the class consisting of mercury, platinum, palladium, lead, indium, cobalt, tin, bismuth, cadmium, nickel, thallium, ruthenium, rhodium, osmium, iridium, copper, silver and gold tellurides and selenides, which comprises precipitating the desired compounds from media containing the respective members thereof by admixture with precipitating agents of the group consisting of hypophosphorous acid, phosphorous acid, and phosphorus trichloride in the proportion of from 0.1 to 25.0 molecular weight per atomic weight of tellurium and selenium, and isolating the desired compound from the mixture.

2. Method for the preparation of a compound selected from the class consisting of mercury, platinum, palladium, lead, indium, cobalt, tin, bismuth, cadmium, nickel, thallium, ruthenium, rhodium, osmium, iridium, copper, silver and gold tellurides and selenides, which comprises precipitating the desired compound from solutions containing the respective ions thereof by admixture with hypophosphorous acid in the proportion of from 0.1 to 25.0 molecular weight per atomic weight of tellurium and selenium, and isolating the desired compound from the mixture.

3. Method for the preparation of a compound selected from the class consisting of mercury, platinum, palladium, lead, indium, cobalt, tin, bismuth, cadmium, nickel, thallium, ruthenium, rhodium, osmium, iridium, copper, silver and gold tellurides and selenides, which comprises precipitating the desired compound from solutions containing the respective ions thereof by admixture with phosphorous acid in the proportion of from 0.1 to 25.0 molecular weight per atomic weight of tellurium and selenium, and isolating the desired compound from the mixture.

4. Method for the preparation of a compound selected from the class consisting of mercury, platinum, palladium, lead, indium, cobalt, tin, bismuth, cadmium, nickel, thallium, ruthenium, rhodium, osmium, iridium, copper, silver and gold tellurides and selenides which comprises precipitating the desired compound from solutions containing the respective ions thereof by admixture with phosphorus trichloride in the proportion of from 0.1 to 25.0 molecular weight per atomic weight of tellurium and selenium, and isolating the desired compound from the mixture.

5. Method for the preparation of mercury telluride, which comprises precipitating dissolved mercury and tellurium ions by admixture with aqueous hypophosphorous acid in the proportion of from 0.1 to 25.0 molecular weight per atomic weight of the said tellurium, and isolating the desired compound from the mixture.

6. Method for the preparation of nickel selenide, which comprises precipitating dissolved nickel and selenium ions by admixture with aqueous hypophosphorous acid in the porportion of from 0.1 to 25.0 molecular weight per atomic weight of the said selenium and isolating the desired compound from the mixture.

7. Method for the preparation of mercury selenide, which comprises precipitating dissolved mercury and selenium ions by admixture with aqueous hypophosphorous acid in the proportion of from 0.1 to 25.0 molecular weight per atomic weight of the said selenium and isolating the desired compound from the mixture.

8. Method for the preparation of bismuth selenide, which comprises precipitating dissolved bismuth and selenium ions by admixture with phosphorus trichloride in the proportion of from 0.1 to 25.0 molecular weight per atomic weight of the said selenium and isolating the desired compound from the mixture.

9. Method for the preparation of bismuth telluride, which comprises precipitating dissolved bismuth and tellurium ions by admixture with aqueous hypophosphorous acid in the proportion of from 1.0 to 25.0 molecular weight per atomic weight of the said tellurium and isolating the desired compound from the mixture.

10. Method for the preparation of silver selenide which comprises precipitating dissolved silver and selenium ions by admixture with aqueous hypophosphorous acid in the proportion of from 0.1 to 25.0 molecular weight per atomic weight of the said selenium and isolating the desired compound from the mixture.

11. Method for the preparation of compounds selected from the class consisting of the tellurides and selenides of mercury, platinum, palladium, lead, indium, cobalt, tin, bismuth, cadmium, nickel, thallium, ruthenium, rhodium, osmium, iridium, copper, silver and gold, which comprises precipitating the said composition by admixture of a solution containing the desired metal ions and the ions of a compound selected from the class consisting of tellurium and selenium by admixture with a solution of a reducing agent selected from the class consisting of hypophosphorus acid, phosphorus acid and phosphorus trichloride in the proportion of from 0.1 to 25.0 molecular weight of the said reducing agent per atomic weight of the said tellurium and selenium, the said precipitation being conducted in the presence of a compound selected from the group consisting of tartaric acid, citric acid and malic acid, the proportion of the said compound being from 0.1% to 20% by weight relative to the weight of total solutions present and isolating the desired metal compound from the mixture.

References Cited in the file of this patent

UNITED STATES PATENTS

| 2,534,562 | Thomsen | Dec. 19, 1950 |
| 2,860,954 | Bueker et al. | Nov. 18, 1958 |

FOREIGN PATENTS

| 142,728 | Australia | Aug. 6, 1951 |

OTHER REFERENCES

Thorpe: "Dictionary of Applied Chemistry," Longmans, Green and Co., N.Y., 1916, vol. V, page 434.

Hampel: "Rare Metals Handbook," Reinhold Publishing Co., N.Y., 1954, pages 369, 375, 407, and 413.

Feigl: "Chemistry of Specific, Selective and Sensitive Reactions," Academic Press Inc., publishers, N.Y., 1949, pages 69 to 108.

Mellor's "Comprehensive Treatise on Inorganic and Theoretical Chemistry," Longmans, Green and Co., N.Y., vol. 10, 1930, pp. 778, 794, 800; vol. 11, 1931, pp. 52 and 60.